(12) United States Patent
Yamaguchi et al.

(10) Patent No.: US 7,344,791 B1
(45) Date of Patent: Mar. 18, 2008

(54) ELECTROLYTIC MEMBRANE FOR FUEL CELL AND ITS MANUFACTURING METHOD, AND FUEL CELL AND ITS MANUFACTURING METHOD

(75) Inventors: Takeo Yamaguchi, Kanagawa (JP); Shinichi Nakao, Tokyo (JP)

(73) Assignee: TOUDAI TLO, Ltd., Tokyo (JP)

( * ) Notice: Subject to any disclaimer, the term of this patent is extended or adjusted under 35 U.S.C. 154(b) by 0 days.

(21) Appl. No.: 09/936,148

(22) PCT Filed: Mar. 7, 2000

(86) PCT No.: PCT/JP00/01370

§ 371 (c)(1),
(2), (4) Date: Sep. 7, 2001

(87) PCT Pub. No.: WO00/54351

PCT Pub. Date: Sep. 14, 2000

(30) Foreign Application Priority Data

Mar. 8, 1999 (JP) ................................. 11-060817

(51) Int. Cl.
*H01M 8/10* (2006.01)
(52) U.S. Cl. ............................ 429/30; 429/40; 429/41; 429/44; 429/33; 429/46; 429/12
(58) Field of Classification Search ................. 429/30, 429/40, 41, 44, 33, 46, 12
See application file for complete search history.

(56) References Cited

U.S. PATENT DOCUMENTS

| | | | |
|---|---|---|---|
| 3,647,086 A | * | 3/1972 | Mizutani et al. ........ 210/500.38 |
| 4,113,922 A | | 9/1978 | D'Agostino et al. |
| 4,828,941 A | * | 5/1989 | Sterzel ........................ 429/33 |
| 5,798,180 A | * | 8/1998 | Chowdhury et al. ..... 428/411.1 |
| 6,242,135 B1 | * | 6/2001 | Mushiake .................... 429/30 |
| 6,248,469 B1 | * | 6/2001 | Formato et al. .............. 429/41 |
| 6,365,294 B1 | * | 4/2002 | Pintauro et al. ............. 429/33 |

FOREIGN PATENT DOCUMENTS

| | | |
|---|---|---|
| DE | 198 26 702 A1 | 12/1998 |
| JP | 64-22932 | 1/1989 |
| JP | 2-281567 | 11/1990 |

(Continued)

*Primary Examiner*—Laura Weiner
(74) *Attorney, Agent, or Firm*—Christensen O'Connor Johnson Kindness PLLC

(57) ABSTRACT

A conventional direct methanol solid polymer fuel cell comprises a solid polymer electrolyte as an electrolyte. This type of cell involves some problems; methanol permeates the membrane; the electromotive force lowers because of direct oxidation; and the membrane melts at about 130° C. when the temperature is increased to enhance the catalyst activity. According to the invention, an electrolyte membrane made of a porous substrate (1) that does not swell substantially with methanol and water and has pores (2) filled with a polymer (3) having proton conductivity is produced and used to suppress the permeation of methanol as much as possible, providing an electrolyte membrane for fuel cells endurable in a high-temperature environment, a fuel cell comprising such a membrane, a method of manufacturing such a fuel cell, and a method of manufacturing an electrolyte membrane comprising irradiation a porous substrate having swell-resistance against organic solvent and water with energy and contacting the substrate with a monomer to cause polymerization.

53 Claims, 3 Drawing Sheets

FOREIGN PATENT DOCUMENTS

| | | |
|---|---|---|
| JP | 3-98632 | 4/1991 |
| JP | 3-208260 | 9/1991 |
| JP | 7-65624 | 3/1995 |
| JP | 11-135137 | 5/1999 |
| WO | WO 96/29752 A1 | 9/1996 |
| WO | WO 97/40924 * | 11/1997 |
| WO | WO 98/22989 A1 | 5/1998 |
| WO | WO 99/10165 A1 | 3/1999 |

* cited by examiner

ELECTROLYTIC MEMBRANE FOR FUEL CELL AND ITS MANUFACTURING METHOD, AND FUEL CELL AND ITS MANUFACTURING METHOD

TECHNICAL FIELD

The present invention generally relates to an ion-selective membrane, and more particularly to an electrolyte membrane for a polymer electrolyte fuel cell.

The present invention also relates to a fuel cell having such electrolyte membrane and a manufacturing method of the electrolyte membrane.

BACKGROUND OF INVENTION

The recent encouraged global activities of environmental protection put strong demands for restrictions on greenhouse gases and NOx gas production. In order to reduce the total amount of such exhaust gases, practical application of fuel cell system to automobile is thought to be very useful.

Polymer electrolyte fuel cells (PEFCs) have several advantages: operative at a low temperature; high power density; and generation of water alone during power generating reaction. Among all, PEFCs using methanol as fuel are thought to be a promising power source for an electric automobile since they enables fuel supply in a liquid form like gasoline.

PEFCs are classified into two types: reformed methanol-type polymer electrolyte fuel cells which involve reforming methanol into hydrogen-containing gas using a reformer; and direct methanol polymer fuel cells (DMFCs) which utilize methanol directly without using a reformer. Practical use of direct methanol polymer fuel cells is expected due to their great advantages: weight-saving is possible since direct methanol polymer fuel cells do not require a reformer; resistance against frequent start and stop operations; significantly improved load change response; and substantially reduced catalyst poisoning.

However, several difficulties associated with implementation of DMFC have also been pointed out. For example, DMFCs use a solid-state polymer electrolyte as the electrolyte. However, when a conventional electrolyte membrane for PEFC such as Nafion™ available from Du Pont or Dow membrane available from Dow Chemical is used, it causes two major problems: methanol will permeate the membrane, and thus the membrane will be directly oxidized and electromotive power will be reduced; and there occurs melting (creeping) of the membrane at an elevated temperature, about 130° C., for increasing catalyst activity. Although no electrolyte membranes exist which can simultaneously resolve these problems, solution of these problems may greatly promote development of DMFC applicable to automatic vehicles.

DISCLOSURE OF INVENTION

Accordingly, an object of the present invention is to implement a novel electrolyte membrane that has greatly reduced methanol crossover and is endurable in a high-temperature (about 130° C. or higher) environment.

Another object of the present invention is to provide a method for manufacturing the electrolyte membrane.

Further, an object of the present invention is to implement a novel direct methanol polymer fuel cell having the electrolyte membrane.

The present inventors found, after intense studies to solve the above-described problems that a novel electrolyte membrane for fuel cell that can simultaneously resolve these problems may be obtained by filling a polymer having proton conductivity in the pores of a heat-resistant porous substrate, which is substantially swell-resistant against organic solvent and water.

Polymers are generally softened at a higher temperature but they can maintain their properties until they are thermally decomposed. Accordingly, the present inventors assumed that if polymers are embedded into the pores of the heat resistant porous substrate through chemical bond, the framework of the substrate could support the structure of the membrane at elevated temperatures. The novel electrolyte membrane is based on this assumption.

Further, the present inventors invented a novel method for filling the pores of a porous substrate with polymer(s), the process comprising the steps of: activating the surface of the pores of the porous substrate by irradiation with energy such as plasma, UV radiation, electron rays, gamma radiation or the like; and then contacting with or applying to the activated surface monomers each having an ion exchange group to be allowed to react graft polymerization both on the surface of and in the pores of the substrate, thereby substantially filling the pores of the porous substrate with polymer.

The electrolyte membrane according to the present invention may be characterized by that a polymer having proton conductivity is filled in the pores of a heat-resistant porous substrate having swell-resistance against organic solvent and water.

In the electrolyte membrane according to the present invention, proton conductivity may be provided by the electrolyte embedded in the pores of the porous substrate while the form-stability at higher temperature and swell- and heat-resistances of the membrane may be provided by the porous substrate matrix.

EMBODIMENTS OF THE INVENTION

Figure 1:
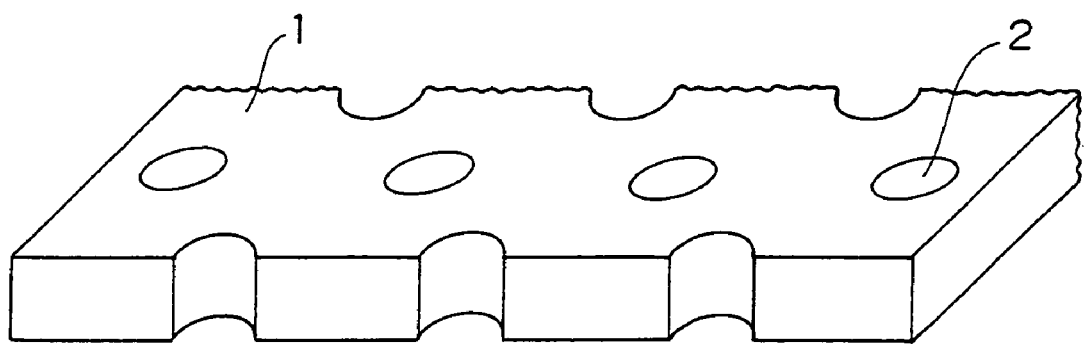
FIG. 1 is a partial cross-sectional view of a porous substrate showing one step of the process for plasma-graft-polymerizing monomers on the porous substrate.

The present invention will be described hereinafter in more detail.

An electrolyte membrane according to the present invention may comprise, as a substrate, a heat-resistant porous material that does not swell substantially with water and organic solvents such as methanol. Examples of such porous material may be inorganic materials including glass or ceramics such as alumina and silica; and others including Teflon™ and polyimide. These materials may be used alone, or a composite material made of two or more of the above-mentioned materials. When the substrate comprises the composite material, the substrate may have a structure consisting of two or more layers with each layer consisting of the above-mentioned material.

According to the present invention, percentage of pores may preferably be 10% to 95% by volume of the substrate. The average pore size is desirably within the range of 0.001 to 100 μm. Thickness of the substrate may be 100 μm or less, and preferably in the order of several μm.

In the electrolyte membrane according to the present invention, graft polymer consisting of monomers each having an ion-exchange group is formed at least on the inner surfaces of the pores provided in the porous substrate such that the pores are substantially filled with the graft polymer. Thus, one end of the graft polymer is bound to the inner surface of the pores, which efficiently prevents the graft polymer from flowing or eluting out of the pores easily.

The term "ion-exchange group" herein refers to a group, which carries and easily release proton such as —$SO_3^-$ from —$SO_3H$ group. The groups exist in a pendant pattern of the graft polymer, which is then filled in the pores, thereby providing proton conductivity.

Such graft polymerization of monomers may be performed by exciting the substrate with, for example, plasma, UV radiation, electron rays, gamma-radiation or the like to generate reaction start point, and then contacting monomers with the reaction start point. Alternatively, chemical process using silane coupler or the like or any other conventional polymerization process may be used in which polymerization is performed in the pores and then the resultant polymer is bound to the substrate.

According to the present invention, plasma graft polymerization may be most preferably used which will be described below. Plasma graft polymerization may be performed by using the liquid phase process described below and any well-known vapor phase polymerization.

Monomers which can be used in the present invention preferably include, but are not limited to, sodium acryl sulfonate (SAS), sodium methallyl sulfonate (SMS), sodium p-styrene sulfonate (SSS) and acrylic acid (AA). Also included are monomers which have vinyl groups and strong acid groups such as sulfonic acid or phosphonic acid group, weak acid groups such as carboxyl group, strong base groups such as primary, secondary, tertiary and quaternary amines, or weak base groups, as well as derivatives (e.g., esters) thereof. The Examples of the monomers may include, but being not limited to, allylamine, allyl sulfonate, allyl phosphonate, methallyl sulfonate, methallyl phosphonate, vinyl sulfonate, vinyl phosphonate, styrene sulfonate, styrene phosphonate, sulfonate or phosphonate derivatives of acrylamide, ethyleneimine, methacrylate and the like.

Only one of the above-described monomers may be used to form homopolymer. Alternatively, two or more of the above-described monomers may be used to form copolymer.

Proton conductivity of the electrolyte membrane may depend on the type of monomers to be used. Desirably, material(s) having higher proton conductivity may be used.

Proton conductivity of the electrolyte may also depend on the degree of polymerization of the graft polymer filled in the pores. The degree of polymerization of the graft polymer filled in the pores may be represented by the density of the polymer in the pores. According to the present invention, the graft polymer may have the same density in the pores as the highest density of the polymer obtained under conventional conditions. The density of the graft polymer according to the present invention may depend on the type of the monomer(s) to be used. If the highest density of the polymer obtained under conventional conditions is normalized as 1, the density of the graft polymer according to the present invention may be, for example, 1.2 or less and 0.2 or more represented by the normalized density, in order to have proton conductivity and desired methanol permeability.

Plasma graft polymerization which can be used in production of the electrolyte membrane according to the present invention may involve irradiating a substrate with plasma to generate reaction start point on the surface of the substrate as well as on the inner surface of the pores in the substrate, and then preferably contacting monomers with the substrate by well-known liquid phase polymerization to graft-polymerize the monomers both on the surface and in the pores of the substrate.

Hereinafter, plasma graft polymerization which can be used in the present invention will be described in detail in reference to the drawings. Detailed descriptions regarding plasma graft polymerization are described in the precedent patent applications filed by the present inventors, Japanese Patent Application Laid-Open Nos. 3-98632, 4-334531, 5-31343, 5-237352, and 6-246141.

FIG. 1 is a partial cross-sectional perspective view showing a porous substrate 1 which can be used in the electrolyte membrane according to the present invention. The porous substrate 1 has a number of pores 2 provided therein which extend through the substrate from one side to another side.

The porous substrate 1 is plasma-treated in the presence of gas such as argon, nitrogen or air under a pressure in the range of from 1 mPa to 120 kPa, at normal frequency of 10 to 50 MHz, at power of 1 to 1000 W for 1 to 1000 seconds. Then, reaction start point (not shown) may be formed on the surface of the substrate 1 in the region that has been exposed to the plasma (including the inner surface of the pores).

Next, monomer(s) having an ion-exchange group may be dissolved in water to prepare homogenous solution of monomer. Concentration of monomer aqueous solution is preferably within the range of 0.1 to 80 percent by weight.

The plasma-treated substrate 1 is then subject to contact with the monomer aqueous solution. More particularly, the porous substrate 1 having the reaction start point formed thereon may be immersed in the aqueous solution of monomer. This step may preferably be performed at 20 to 100° C. while bubbling with inert gas such as nitrogen gas. The substrate 1 may be immersed in the solution for approximately from 1 minute to 1 day.

Then, the porous substrate 1 is removed from the aqueous solution after a predetermined time, washed with organic solvent such as toluene or xylene, and dried. In this way, by-product(s) produced during the polymerization process such as homopolymer can be completely removed by washing with such organic solvent while the graft polymer may be left only on the surface and inner space of the pores in the substrate.

Figure 2:
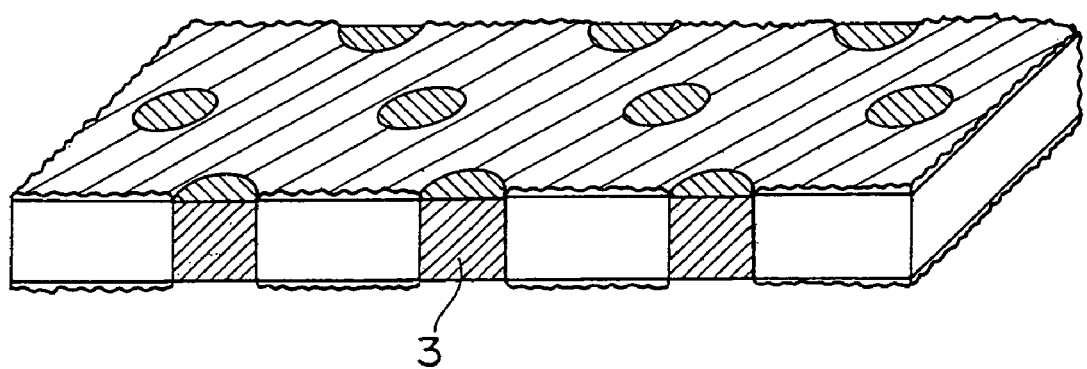
FIG. 2 is a partial cross-sectional view of a porous substrate showing another step of the process for plasma-graft-polymerizing monomers on the porous substrate.

FIG. 2 is a perspective view conceptually showing the substrate 1 on which monomer(s) are graft polymerized. It can be seen that the graft-polymerized polymer 3 is formed not only on the surface of the substrate but also in the pores 2 of the substrate such that the pores are substantially filled with the polymer.

By the above-described plasma-graft-polymerization, an electrolyte membrane can be produced such that pores 2 of a porous substrate 1 are substantially filled with a graft polymer. Since graft polymer according to the present invention is chemically bound to the surface of the substrate, the structure of the membrane may be supported by the substrate 1. Thus, the polymer may not be easily released from the pores 2, and the structure of the membrane is stable even at elevated temperatures unless the polymer is thermally decomposed.

The electrolyte membrane according to the present invention may preferably be used in fuel cells, and particularly in methanol fuel cells including direct methanol polymer fuel cells and reformed methanol-type PEFCs. Most preferably, the electrolyte membrane according to the present invention may be used in direct methanol polymer fuel cells.

Figure 4:
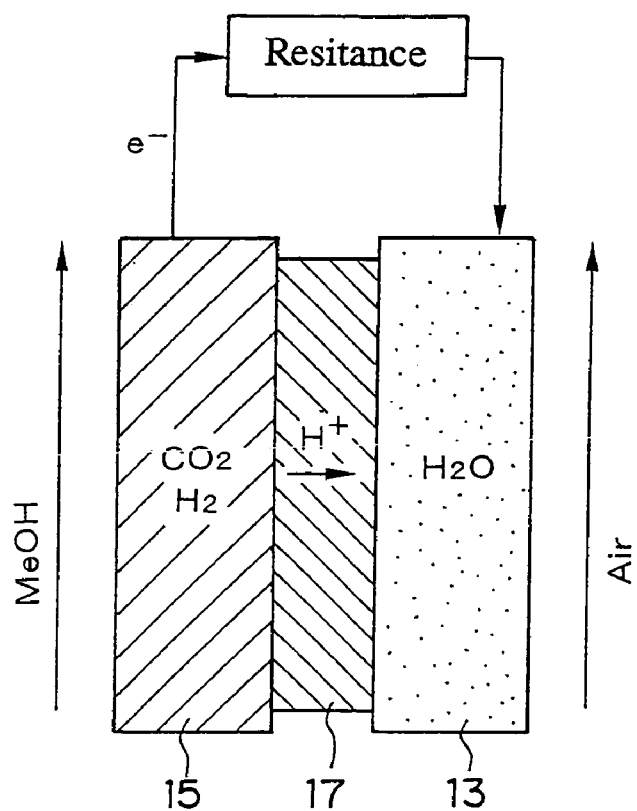
FIG. 4 is a schematic view showing one aspect of a methanol fuel cell, which employs the electrolyte membrane according to the present invention.

Configuration of a methanol fuel cell will be briefly described in reference to FIG. 4.

FIG. 4 is a schematic view showing one aspect of a methanol fuel cell using the electrolyte membrane according to the present invention.

A methanol fuel cell 11 comprises a cathode 13, an anode 15 and an electrolyte 17 sandwiched therebetween. Alternatively, a reformed methanol-type PEFC may additionally comprise a reformer (not shown) provided on the anode side.

Any conventionally known cathode may be used as the cathode according to the present invention. The cathode may include a catalyst layer and a support layer, for example, wherein the catalyst layer is formed adjacent to the electrolyte and a support layer for supporting the catalyst layer is formed adjacent to the catalyst layer.

Alternatively, any conventionally known anode may also be used as the anode according to the present invention. The anode may include a catalyst layer and a support layer, for example, wherein the catalyst layer is formed adjacent to the electrolyte and a support layer for supporting the catalyst layer is formed adjacent to the catalyst layer.

Further, a methanol fuel cell having an electrolyte according to the present invention may also be obtained by integrating a first electrode together with an electrolyte to form an integrated product, and attaching a second electrode, which is different from the first electrode, to the product so that the catalyst layer of the second electrode is brought in tight contact with the electrolyte.

A methanol fuel cell having a cathode as the first electrode will be described in reference to FIG. 5.

Figure 5:
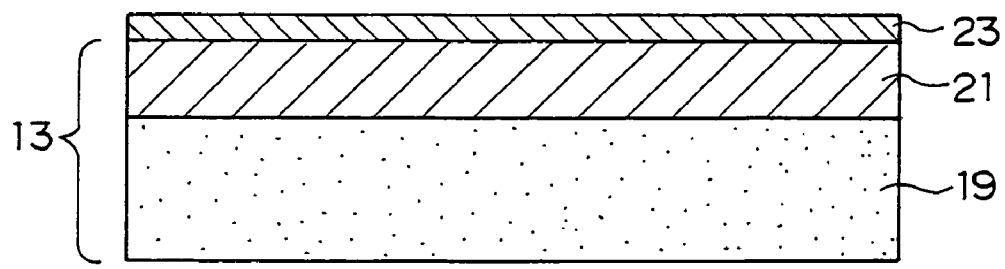
FIG. 5 is a schematic view showing one aspect of a cathode, which employs the electrolyte membrane according to the present invention.

FIG. 5 is a schematic view showing one aspect of a cathode having an electrolyte membrane according to the present invention.

As shown in FIG. 5, the cathode 13 may comprise a support layer 19 and a catalyst layer 21 formed thereon.

The support layer 19 may be preferably comprised of material which has gas permeability (particularly oxygen gas permeability), heat-resistance and electron conductivity, e.g., porous carbon having electron conductivity.

The catalyst layer 21 carries any conventionally known catalyst suitable for the cathode.

A porous thin layer 23 having a number of pores 2 as shown in FIG. 1 may be formed on the catalyst layer 21. Forming processes of the porous thin layer include: preparing a sol that may comprise a variety of silicon alkoxides, aluminum alkoxides, titanium alkoxides or zirconium alkoxides, which will form glasses or ceramics; and then applying the sol to the catalyst layer by any well-known method such as dip coating, spin coating, spray coating or the like. Thus applied sol may be then dried, and if desired heated, to form a porous thin layer. The resultant porous thin layer may be preferably made of silica, alumina (e.g., γ-alumina), titania or zirconia, or mixture or complex of two or more of these materials.

Pores of the resultant thin porous layer may be then filled with the above-mentioned polymer by, for example, graft-polymerization and preferably by plasma-graft-polymerization such that one end of the polymer is bound to the inner surface of the pores. Thus, cathode and electrolyte may be integrated.

This integrated product may facilitate the handling of the thin electrolyte membrane.

The integrated product may be attached to an anode such that the catalyst layer of the anode is brought into tight contact with the electrolyte of the product.

Although the integration of cathode and electrolyte has been described above, it may be easily contemplated by those skilled in the art that anode may be integrated with electrolyte.

EXAMPLE

The present invention will be described in more detail in reference to the following example.

Example 1

A porous PTFE membrane was used as the substrate (Teflon™, manufactured by Nitto Denko; plain film; thickness=70 µm; and pore size=50 mm). The substrate was washed and irradiated with plasma under the following conditions:

Radiofrequency power: 30 W;
Plasma-irradiation time: 60 seconds;
Atmosphere: Argon gas; and
Pressure: 10 Pa.

After plasma-irradiation, the substrate was immersed in freeze-deaerated monomer solution for graft polymerization. Conditions used for graft polymerization were as follows:

Monomer: Acrylic acid (AA);
Monomer concentration: 10 (% by weight);
Solvent: Water;
Temperature: About 60° C.; and
Time: 10 to 24 hours.

The porous substrate was removed from the solution, washed in water, and then dried. Next, the dry weight of the membrane was compared to the original weight of the membrane before polymerization, to calculate the graft polymerization weight. The graft polymerization weight was 1.7 mg/cm$^2$. The resulting membrane obtained by polymerization had a thickness of about 90 µm.

FT-IR (Mapping method) of the resultant membrane was determined to find that the peak of 1740 cm$^{-1}$ derived from carbonic acid group was also present in the membrane. It shows that the pores in the membrane were filled with polymer.

Figure 3:
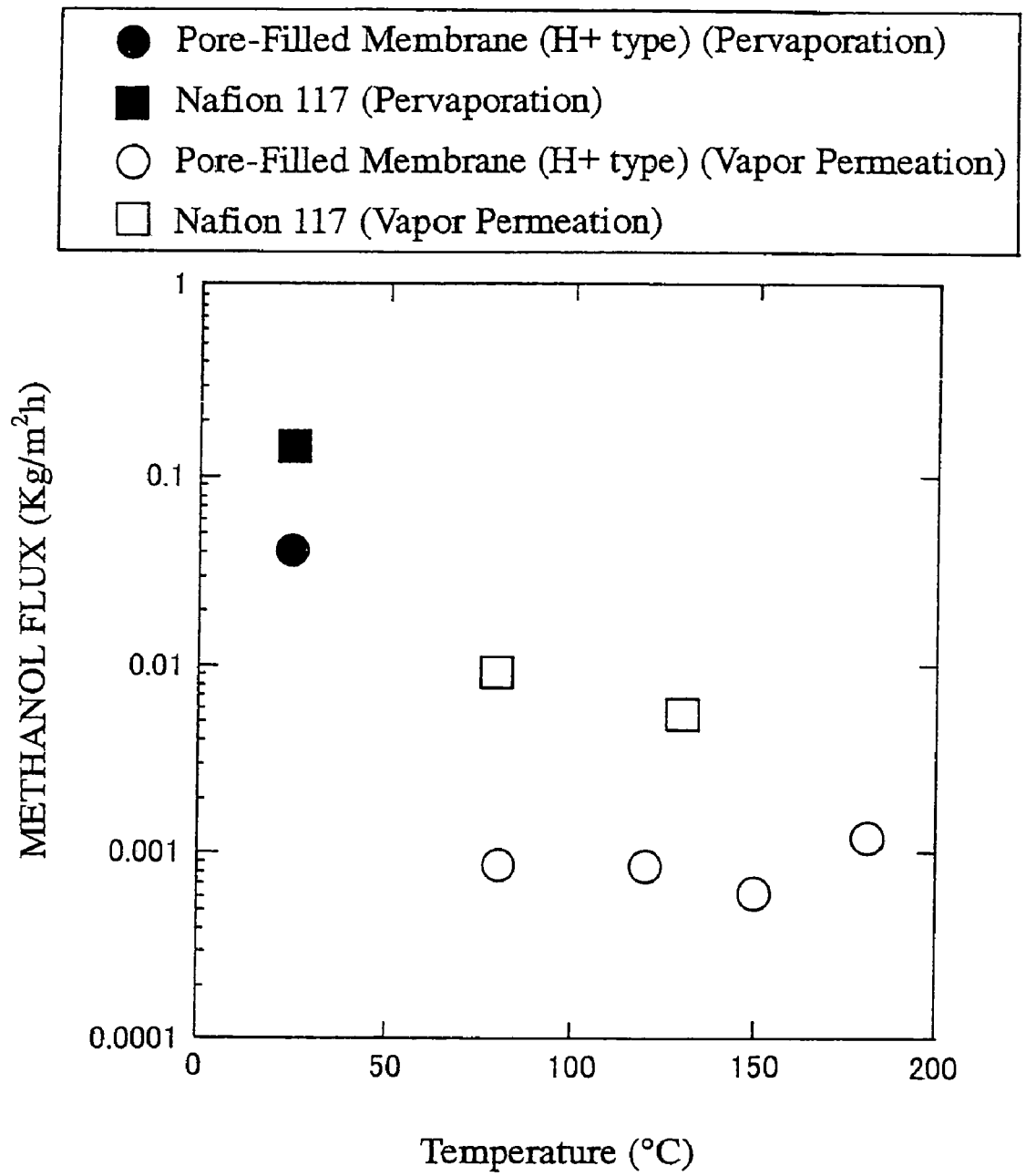
FIG. 3 is a graph showing the methanol permeation flux for the electrolyte membrane according to the Example (pore-filled membrane) measured by pervaporation and vapor permeation tests, exhibiting the ability of the pore-filled membrane to prevent methanol permeation.

FIG. 3 is a graph showing the ability of the electrolyte membrane (pore-filled membrane) according to this example (AA membrane: polymerization weight=1.7 mg/cm$^2$) to prevent methanol permeation measured by two tests: pervaporation test (at 25° C.); and vapor permeation test (at 80 to 180° C.). For comparison, Nafion™ membrane was also subjected to the same tests. Water/methanol (10/90 percent by weight) was supplied under its equilibrium vapor pressure at 25° C. The abscissa axis of the graph shows temperature (° C.) and the vertical axis shows the permeability flux.

As shown in FIG. 3, in pervaporation test at 25° C. the pore-filled membrane exhibited very low methanol flux of 0.042 kg·m$^{-2}$·h$^{-1}$, apparently indicating its better ability to inhibit methanol permeation when compared to that of Nafion membrane at the same temperature.

Further, vapor permeation test showed that the pore-filled membrane did not show any increase in methanol permeation flux at an elevated temperatures of 130° C. or higher, and kept its ability to highly inhibit methanol permeation up to about 180° C. On the other hand, a conventional electrolyte membrane, Nafion™ began to creep at about 130° C., and it no longer had its original form when the test completed.

From the description above, it will be appreciated that an electrolyte membrane can be provided which has a reduced methanol flux, heat-resistance at temperatures of 130° C. or higher and improved proton conductivity which are required for an electrolyte membrane for DMFC.

What is claimed is:

1. An electrolyte membrane comprising a porous substrate that does not swell substantially with organic solvents or water;
    wherein at least a pore of the porous substrate is filled with a graft polymer;
    wherein the graft polymer has proton conductivity and is derived from monomers having an ion-exchange group which carries and easily releases a proton, thereby to impart proton conductivity to the electrolyte membrane; and
    one end of a molecule of the graft polymer is bound to a surface of the pore.

2. The electrolyte membrane according to claim 1, wherein the porous substrate comprises an inorganic material and/or a polymer.

3. The electrolyte membrane according to claim 2, wherein the inorganic material is one selected from the group consisting of ceramics and glass.

4. The electrolyte membrane according to claim 2, wherein the inorganic material is one selected from the group consisting of glass, alumina, silica, titania and zirconia.

5. The electrolyte membrane according to claim 2, wherein the polymer for the porous substrate is polytetrafluoroethylene or polyimide.

6. The electrolyte membrane according to claim 1, wherein the porous substrate comprises an inorganic material and/or a heat-resistant polymer.

7. The electrolyte membrane according to claim 6, wherein the heat-resistant polymer for the porous substrate is polytetrafluoroethylene or polyimide.

8. The electrolyte membrane according to claim 1, which has an ability to prevent methanol permeation.

9. The electrolyte membrane according to claim 1, which has an ability to prevent methanol permeation at a temperature of 130° C. or higher.

10. A fuel cell comprising the electrolyte membrane according to claim 1, wherein the electrolyte membrane is formed on a cathode or on a catalyst layer which is formed on the cathode.

11. An electrolyte membrane comprising a porous substrate comprising an inorganic material and/or a heat-resistant polymer,
    wherein at least a pore of the porous substrate is filled with a graft polymer;
    wherein the graft polymer has proton conductivity and is derived from monomers having an ion-exchange group which carries and easily releases a proton, thereby to impart proton conductivity to the electrolyte membrane; and
    one end of a molecule of the graft polymer is bound to a surface of the pore.

12. The electrolyte membrane according to claim 11, which has an ability to prevent methanol permeation.

13. The electrolyte membrane according to claim 11, which has an ability to prevent methanol permeation at a temperature of 130° C. or higher.

14. The electrolyte membrane according to claim 11, wherein the inorganic material is one selected from the group consisting of ceramics and glass.

15. The electrolyte membrane according to claim 11, wherein the inorganic material is one selected from the group consisting of glass, alumina, silica, titania and zirconia.

16. The electrolyte membrane according to claim 11, wherein the heat-resistant polymer for the porous substrate is polytetrafluoroethylene or polyimide.

17. A fuel cell comprising the electrolyte membrane according to claim 11, wherein the electrolyte membrane is formed on a cathode or on a catalyst layer which is formed on the cathode.

18. An electrolyte membrane comprising a porous substrate comprising an inorganic material and/or a polymer,
    wherein a pore of the porous substrate is filled with a graft polymer;
    wherein the graft polymer has proton conductivity and is derived from monomers having an ion-exchange group which carries and easily releases a proton, thereby to impart proton conductivity to the electrolyte membrane; and
    one end of a molecule of the graft polymer is bound to a surface of the pore.

19. The electrolyte membrane according to claim 18, which has an ability to prevent methanol permeation.

20. The electrolyte membrane according to claim 18, which has an ability to prevent methanol permeation at a temperature of 130° C. or higher.

21. The electrolyte membrane according to claim 18, wherein the inorganic material is one selected from the group consisting of ceramics and glass.

22. The electrolyte membrane according to claim 18, wherein the inorganic material is one selected from the group consisting of glass, alumina, silica, titania and zirconia.

23. The electrolyte membrane according to claim 18, wherein the polymer for the porous substrate is polytetrafluoroethylene or polyimide.

24. A fuel cell comprising the electrolyte membrane according to claim 18, wherein the electrolyte membrane is formed on a cathode or on a catalyst layer which is formed on the cathode.

25. A method for manufacturing an electrolyte membrane, comprising:
    irradiating with energy a porous substrate that does not swell substantially with organic solvents or water;
    contacting the substrate with monomers each having an ion-exchange group which carries and easily releases a proton, thereby to impart proton conductivity to the electrolyte membrane; and
    allowing the monomers to polymerize in at least one pore wherein one end of the resulting polymer molecule is bound to a surface of the pore.

26. A fuel cell, comprising:
    a cathode;
    an anode; and
    an electrolyte membrane sandwiched therebetween,
    wherein the electrolyte membrane comprises a porous substrate and graft polymers having proton conductivity that fill pores in the porous substrate;

wherein the porous substrate comprises an inorganic material and/or a heat-resistant polymer; and wherein at least one end of each of the graft polymers is bound to a surface of one of the pores.

27. The fuel cell according to claim 26, wherein the electrolyte has an ability to prevent methanol permeation.

28. The fuel cell according to claim 26, wherein the electrolyte has an ability to prevent methanol permeation at a temperature of 130° C. or higher.

29. The fuel cell according to claim 26, wherein the inorganic material is one selected from the group consisting of ceramics and glass.

30. The fuel cell according to claim 26, wherein the inorganic material is one selected from the group consisting of glass, alumina, silica, titania and zirconia.

31. The fuel cell according to claim 26, wherein the heat-resistant polymer is polytetrafluoroethylene or polyimide.

32. The fuel cell according to claim 26, wherein the fuel cell is a direct methanol polymer fuel cell.

33. A method for manufacturing a fuel cell, comprising:
applying a sol to a first electrode;
forming a porous thin layer from the applied sol;
filling a polymer in pores of the porous thin layer to form an electrolyte membrane on the first electrode; and
attaching a second electrode onto the electrolyte membrane.

34. The method according to claim 33, wherein the porous thin layer comprises an inorganic material.

35. The method according to claim 34, wherein the inorganic material is one selected from the group consisting of ceramics and glass.

36. The method according to claim 34, wherein the inorganic material is one selected from the group consisting of glass, alumina, silica, titania and zirconia.

37. The method according to claim 33, wherein the electrolyte membrane has an ability to prevent methanol permeation.

38. The method according to claim 33, wherein the electrolyte has an ability to prevent methanol permeation at a temperature of 130° C. or higher.

39. The method according to claim 33, wherein the step of applying the sol to the first electrode, the first electrode has a first catalyst layer and a first support layer, and the sol is applied to the first catalyst layer.

40. The method according to claim 33, wherein the step of attaching the second electrode, the second electrode has a second support layer and a second catalyst layer, and the electrolyte membrane is attached to the second catalyst layer.

41. The method according to claim 33, wherein the step of filling the polymer in pores of the porous thin layer to form an electrolyte membrane on the first electrode, monomers having an ion-exchange group are polymerized so that at least one end of a polymer molecule is bound to a surface of a pore, and the polymer fills the pore.

42. An electrolyte membrane, comprising:
a porous substrate that does not swell substantially with organic solvents or water; and
a polymer having proton conductivity;
wherein the polymer fills pores of the porous substrate;
wherein a layer comprising the polymer is placed on a surface of the porous substrate; and
wherein the porous substrate consists essentially of an inorganic material selected from the group consisting of ceramics and glass.

43. The electrolyte membrane according to claim 42, which has an ability to prevent methanol permeation.

44. The electrolyte membrane according to claim 42, which has an ability to prevent methanol permeation at a temperature of 130° C. or higher.

45. The electrolyte membrane according to claim 42, wherein the inorganic material is one selected from the group consisting of glass, alumina, silica, titania and zirconia.

46. A fuel cell comprising the electrolyte membrane according to claim 42.

47. The fuel cell according to claim 46, wherein the electrolyte membrane is formed on a cathode or on a catalyst layer which is formed on the cathode.

48. An electrolyte membrane, comprising:
a porous substrate having pores; and
proton conductive graft polymers,
wherein each of the proton conductive graft polymers is bound to a surface of one of the pores, and
wherein each of the proton conductive graft polymers has an ion-exchange group that carries and easily releases a proton to thereby impart proton conductivity to the electrolyte membrane.

49. The electrolyte membrane according to claim 48, wherein the porous substrate comprises an inorganic material selected from the group consisting of ceramics and glass.

50. The electrolyte membrane according to claim 48, wherein the porous substrate comprises a polymer selected from the group consisting of polytetrafluoroethylene and polyimide.

51. The electrolyte membrane according to claim 48, which has an ability to prevent methanol permeation.

52. A fuel cell, comprising:
a cathode;
an anode; and
an electrolyte membrane sandwiched therebetween,
wherein the electrolyte membrane comprises a porous substrate and graft polymers having proton conductivity that fill pores in the porous substrate;
wherein the porous substrate comprises an inorganic material and/or a polymer; and
wherein at least one end of each of the graft polymers is bound to a surface of one of the pores.

53. The fuel cell according to claim 52, wherein the fuel cell is a direct methanol polymer fuel cell.

* * * * *